Feb. 6, 1968  A. C. THOMPSON  3,367,601

WIRE COIL WINDING GUIDE

Filed Dec. 15, 1965  2 Sheets-Sheet 1

Andrew C. Thompson INVENTOR.

BY George E. Szekely

Agent

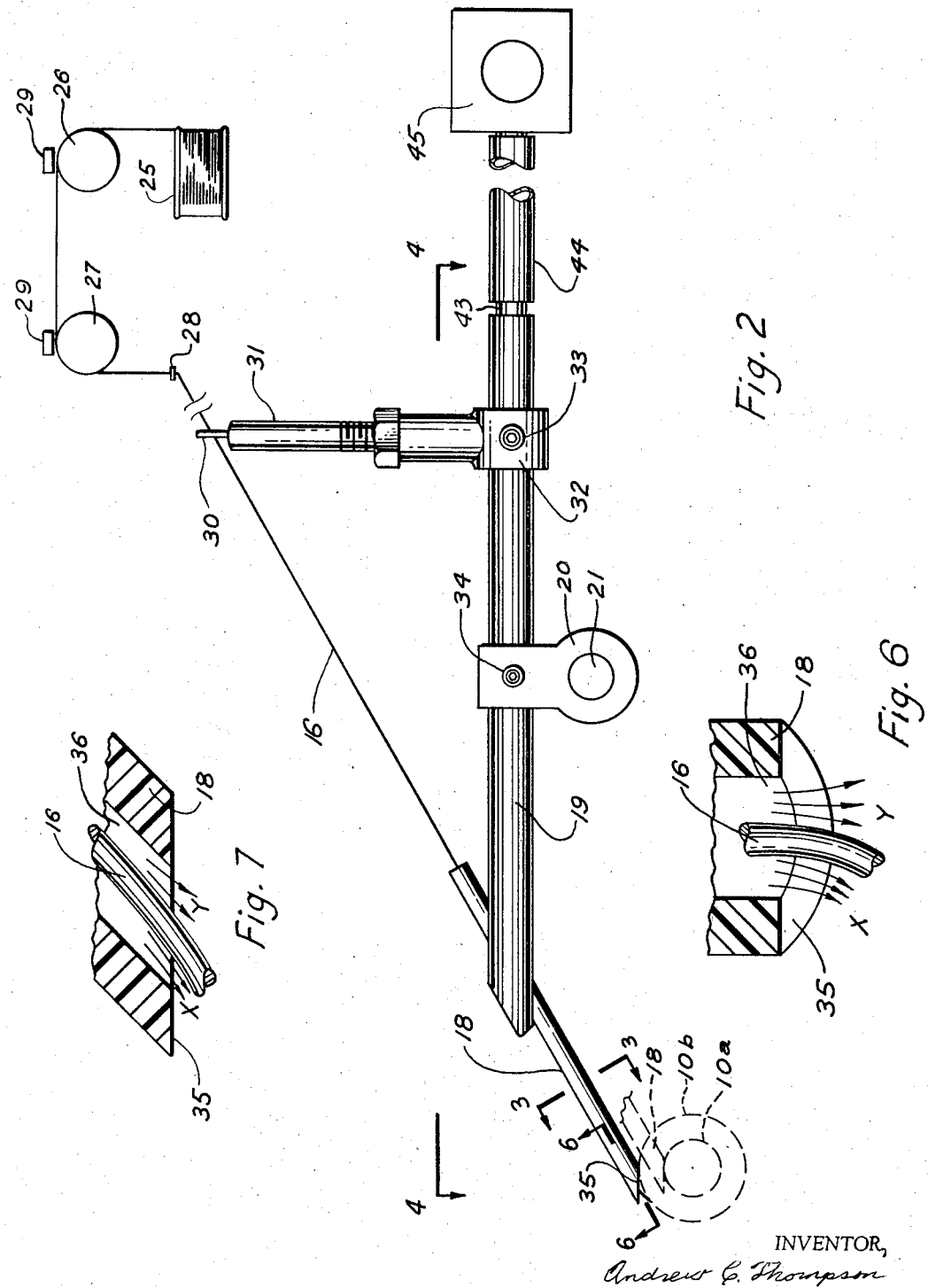

United States Patent Office 3,367,601
Patented Feb. 6, 1968

3,367,601
WIRE COIL WINDING GUIDE
Andrew C. Thompson, 6909 McCollum Lake Road,
Wonder Lake, Ill. 60097
Filed Dec. 15, 1965, Ser. No. 557,327
9 Claims. (Cl. 242—157)

This application relates to a wire guide for winding coils, more particularly electrical coils wound from fine wires.

The electrical and electronics industries require large quantities of small basket weave and solenoid coils for such components as filters, chokes, transformers and the like. These coils often comprise numerous turns of very small wire. For the sake of production economy, such coils are usually machine wound over their cores or forms on high-speed mandrels. Therefore, the wire must be fed at correspondingly high speeds through a shuttling guide. At the speeds normally desired there may be substantial abrasion between the wire and the guide, wherever they touch, resulting in excessive guide wear, damaged wire insulation, or both. The problem is particularly acute on basket weave coils, the guide orifice being necessarily closely fitted to the wire, in order to minimize lash and assure a uniformly tight wind.

Attempts to solve the wear problem with various guide materials have been only partly successful. Those materials which are desirably wear-resistant abrade and spoil the thin plastic insulation coating normally used on small coil wires, whereas materials not so abrasive to the insulation, such as nylon, themselves wear or score and require excessively frequent rework or replacement. Relatively slight wear of the guide results in excessive slack and lashing of the wire, with consequent irregular winding and coil spoilage.

It is a principal object of this invention to provide a guide for winding coils which minimize contact and consequent abrasion between the wire and its guide, whereby uniform, high-quality coils may be wound with minimum equipment maintenance.

More specifically, it is an object of this invention to provide a coil-winding arrangement wherein a film or envelope of air is maintained around the wire as it passes through a guide orifice, thus insulating or separating the wire substantially continuously from the guide wall and orifice edge as the wire is led through the guide.

It is a further object of this invention to provide a coil-winding arrangement which is relatively simple and economical to construct and maintain for high-quantity, low-cost production of small electrical coils, and which can be readily constructed for winding several coils simultaneously on a single mandrel.

Other objects, features and advantages of this invention will be apparent from the following description and accompanying drawings, in which:

FIGURE 2 is a side elevation of a guide unit, showing an associated wire supply system schematically;

FIGURE 6 is a greatly enlarged cross-section at the tip of the guide needle, taken on line 6—6 of FIGURE 2, showing the air-stream counter-effect to wire deviation, and FIGURE 7 is a view similar to FIGURE 6, but taken on line 7—7 of FIGURE 4.

Figure 1:
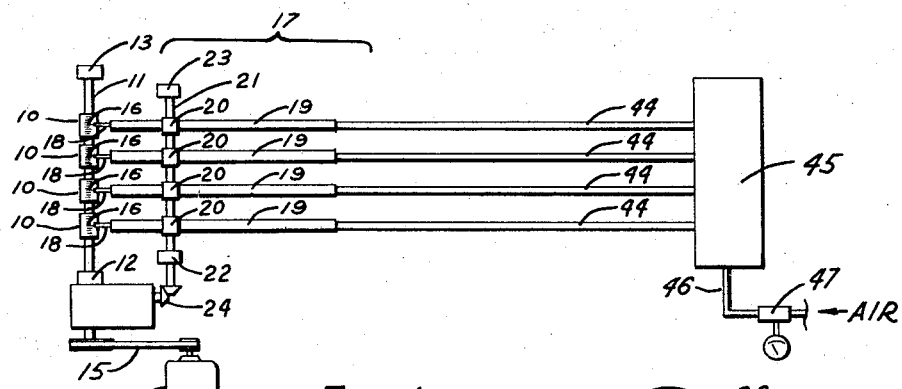
FIGURE 1 is a schematic plan view of a coil winding machine incorporating the wire guides and method of this invention to wind four coils simultaneously.

Since the practice of this invention is not limited to a particular style of winding machine, only so much of a representative machine is shown and described as is necessary to illustrate the construction and use of the novel guide and method in such machines. Therefore, certain details well-known to those skilled in the art of coil-winding are not shown in the machine layout of FIGURE 1, wherein numerals 10 indicate four coils being wound simultaneously on a core-holding mandrel 11. Mandrel 11 is held in a chuck or clutch 12 and revolvably supported on a center 13. Obviously components 12 and 13 may be incorporated in the headstock and tailstock of a lathe or commercial winding machine, if desired. However, for mass production of a limited range of coil sizes, a multi-speed head may not be necessary.

The speed is that best adapted to the wire and coil sizes involved, for rapid even winding. For example, with copper wires on the order of 30–40 gauge and coils about ½" to 1" O.D., a mandrel speed of about 2000 r.p.m. is satisfactory. At 1" coil diameter, the lineal wire speed is over 500 f.p.m. It is a particular advantage of this invention that fine wires may be reliably fed at such relatively high lineal speeds.

Wires 16 are led to the coils 10 from a guide station, indicated generally at 17. The guide arrangement is such as to position needles 18 at the winding location with the wires oriented in a plane tangent to the coils 10. Needles 18 are affixed in holders 19, which are mounted in swivel blocks 20. The relationship is best seen in FIGURE 2. Blocks 20 are journalled on the shuttle rod 21 which is slidably supported on stands 22, 23. Rod 21 and holders 19 reciprocate in predetermined synchronism with rotation of mandrel 11, by means of a take-off from the drive for clutch 12. The take-off may be any suitable combination of worm, gear, cam and link mechanism (not shown), terminating in a shuttle arm 24, connected to rod 21. The shuttle rate and traverse is established for the particular type and length of wind involved. For example, with a closed-wound coil of $d$ diameter wire and $n$ turns per layer, the shuttle rate will be $d$ per revolution of mandrel 11 and the traverse will be $dn$.

A suitable arrangement for supplying wire is shown schematically in FIGURE 2, by way of illustration. Wire from spool 25 is led over sheaves 26, 27 and through an eyelet 28. Snubbers 29 may be used to control tension and prevent run-off.

From the supply train, wire 16 is led to the guide by an eyelet 30, which is positioned on the projected axis of needle 18. For this purpose eyelet 30 is mounted on a stem 31, threaded to yoke 32, which is adjustably clamped to holder 19 by set-screw 33. Needle 18 is positioned to the winding location by sliding holder 19 through block 20 and swiveling block 20 on rod 21. When the correct needle position is established, holder 19 is locked to block 20 by set-screw 34. As will be seen, with holder 19 approximately horizontal, needle 18 is at an angle such that the tip bevel 35 will lie tangentially above the coil form or coil, 10a, as indicated in broken lines of FIGURE 2, at a minimum coil diameter, swiveling upward to tangency with a larger coil body diameter, indicated at 10b. Thus, throughout the normal winding range, bevel 35 is held close to the lay of the wire in the coil. When a multi-layer coil is wound, the holder 19 swivels as the coil is laid up, bevel 35 riding on the laid coil.

Figure 3:
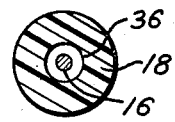
FIGURE 3 is an enlarged cross-section of the guide needle, on line 3—3 of FIGURE 2.
Figure 4:
FIGURE 4 is a top view of the guide needle and tube assembly, on line 4—4 of FIGURE 2.
Figure 5:
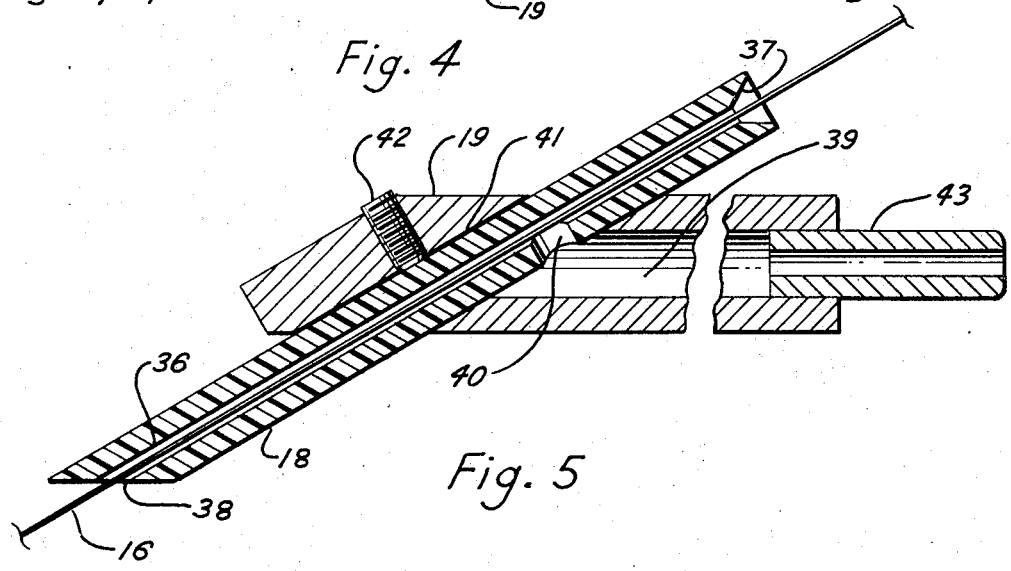
FIGURE 5 is an enlarged cross-section of the guide needle and tube assembly, on line 5—5 of FIGURE 4.

Since ultra-fine wires are inherently very flexible and cannot be highly tensioned without risk of breakage, it is necessary to provide a long, close guide adjacent to the lay, in order to prevent lashing and consequent irregular wind. Representative proportioning of a guide needle is shown in FIGURES 3 and 5. Optimally, the guide eye or bore 36 should be not over twice the diameter of wire 16, in the wire range from 30–40 gauge. For example, a coated 38 gauge wire, slightly over .004 inch diameter, requires a guide eye about .008 inch diameter and the needle length should be about 1½ inches.

The wire lead-in to the needle 18 may be subject to some whipping, the wear effect of which can be substantially minimized by chamfering the eye inlet of the needle, as indicated at 37. Chamfer 37 also facilitates threading the wire into the needle when starting a run of windings. While the closely fitted eye and proximity of the needle tip to the lay (FIGURE 2) substantially damp wire lash in the needle, it will be obvious that as the wire 16 and needle 18 are shuttled and the coil builds up, there is a general tendency for rubbing action along edge 38, due to inertia effects and differential translation, even with the best practical positioning and synchronization. Such high-speed rubbing has several delterious effects, particularly pronounced with coated wires. The use of thin coatings, such as polyurethane, for wire insulation is increasingly popular for miniaturizing coil components. A substantial saving in size can be effected in a coil having numerous turns, if a thin insulating coating is employed in lieu of conventional serving. However, the thin coating may be punctured or stripped in the winding operation by abrasive or cutting effect at edge 38. Good winding results require that the eye 36 be maintained as as an accurately defined orifice a surface 35.

The need to minimize wire damage and the obvious manufacturing cost problems involved in producing needles with long, miniature bores greatly restrict the choice of needle materials. Experience has shown that nylon, or the like, is an adaptable material, but it is highly susceptible to wear or scoring by the rubbing action. Since even slight wear or scoring of the eye 36 near the orifice edge 38 results in poor winding, it has heretofore been necessary to replace needles with inordinate frequency, if coil spoilage was to be minimized. The resulting excessive maintenance and downtime costs are manifestly objectionable.

The apparatus here presented obviates or substantially reduces the deleterious rubbing effects by introduction of a high velocity air-stream into the eye 36. As best seen in FIGURE 5, holder 19 has a blind bore 39, communicating with a port 40 in the wall of needle 18, which is closely fitted in the angularly tranverse bore 41 by setscrew 42. An air inlet is provided by spud 43, which is connected to an air supply by means of a flexible tube 44, FIGURE 2.

In the multiple-coil winding arrangement of FIGURE 1, the several tubes 44 are connected to an inlet manifold 45, supplied by line 46 through a regulator 47. Inlet tubes 44 are preferably made of soft rubber or other highly flexible material, so that holders 19 may be freely adjusted, shuttled and swivelled as required for various types and sizes of coils to be wound.

It will be seen that with an eye 36 on the order of .008 inch diameter a very small volume of air supplied through port 40 will produce a high-pressure air flow along eye 36 in both directions from port 40. The effects of the high pressure air stream are: first, to "float" the filamental wire 16 in eye 36, suppressing any tendency of the wire to undulate or whip in passage; second, to counteract deviation of the wire 16 from its coaxial position in eye 36 as the wire leaves the eye. The latter effect is illustrated in FIGURES 6 and 7. The high-pressure air jet passing tip 35 exerts a significant guiding effect, readily overcoming the small deviant inertial effect of the wire caused by differentials in the translation of the needle 18 and the lateral motion of the wire traversing the coil. Thus, a pressure differential, as represented diagrammatically by convergent air stream at X and divergent air stream at Y, is sufficient to overcome motion differentials due to imperfect synchronization of the needle shuttle with the progress of the wire lay.

Similarly, any differential in outward motion as a multi-layer coil builds up, due to swivel resistance or inertia of the holder 19, is counteracted by the equalizing effect of the air stream, as illustrated in FIGURE 7. Even though the differential in rate of translation between wire and needle is not fully compensated by the airstream effect, the high-pressure air envelope provides a cushioning or separating film such that no substantial direct rubbing contact of wire and needle can persist, so long as air flow is maintained.

A moderate air supply pressure will produce necessary air flow for the purposes described, in an arrangement such as that of FIGURE 1. The usual shop air pressure of 80–100 p.s.i. is greater than necessary for most cases, hence it is desirable to provide the regulator 47, or similar pressure reduction means, at the manifold 45. Holding air flow to the minimum required to accomplish the intended purposes obviates wastage and unpleasant or injurious blasts from the needles. An inlet pressure of about 30 p.s.i. has been found satisfactory for the needle size and construction heretofore particularly described.

While the foregoing description has particularly referred to coated wires, it will be understood that the novel guide is advantageous for bare, served or other wires as well, whether of copper, aluminum or other material. In all manner of high speed coil winding this invention serves a significant function in minimizing irregular winding, guide wear, wire breakage and similar hazards.

It will also be understood that references in the description or drawings to particular sizes, proportions, construction details and arrangements are by way of illustration only. It is not intended that the invention be limited to the forms described. Those skilled in the art will readily perceive variations and modifications which are within the spirit and scope of the invention defined in the appended claims, which are as follows.

I claim:

1. A wire guide for coil winding apparatus comprising: an elongated needle having a wire eye of uniform diameter substantially the full length of said needle from its tip to its butt, a port in the wall of said needle communicating with said eye, said port being located a substantial distance from said tip and said butt, and a holder for said needle having a passage communicating with said port.

2. A wire guide according to claim 1, wherein said passage is open at one end of said holder and at the other end terminates in an intersecting transverse bore, said needle being closely fitted in said bore and projecting therefrom in both directions from said port.

3. A wire guide according to claim 1 wherein said passage is open at one end and at its other end terminates in a non-rectangularly intersecting transverse bore, said needle being closely fitted in said bore, an eyelet being carried by said holder, said eyelet being remote from an end of said needle and adjustable to a position substantially coaxial therewith.

4. In apparatus for winding coils of fine wire, a wire-guide needle comprising: an elongated cylinder having an eye of uniform small diameter substantially the full length of said cylinder, adapted to confine said wire closely, and a transverse port communicating with said eye, said port being spaced a substantial distance from both ends of said needle.

5. A wire guide needle according to claim 4, having a tip and a butt, the tip being skived, said eye being of predetermined diameter for a substantial distance from said tip, to a plane beyond said port, said eye then gradually enlarging toward said butt.

6. A wire guide needle according to claim 4 having a skived tip, said needle being particularly adapted for a predetermined wire diameter, the diameter of said eye for a substantial distance from said tip being aproximately twice said wire diameter.

7. In apparatus for winding coils from fine wire, the combination of: a mandrel having a plurality of winding loci, means for revolving said mandrel, an elongated guide needle for each said locus, a closely-confining wire eye extending substantially the full length of each said needle, each said eye being positioned in wire-winding relation to said mandrel, and means associated with each said needle for discharging air into each said eye in a direction transverse thereto, at a position spaced a substantial distance from both ends of each said needle, whereby to pass air through said eye in both directions from said position while wire passing through said eye is wound on said mandrel.

8. In apparatus for winding wire coils, the combination according to claim 7, further including a transverse port in each said needle communicating with the eye thereof, a holder for each said needle having a transverse bore closely surrounding said needle, a longitudinal passage in said needle terminating at one end in said bore and communicating with said port, said passage at its other end terminating in an air connection, and a flexible air line attached to said connection, said holder being mounted to swivel in a plane substantially at right angles to said mandrel on a rod reciprocable substantially parallel to said mandrel.

9. In apparatus for winding wire coils, the combination according to claim 7 wherein there are pluralities of loci and needles, said needles having ports communicating with the eyes thereof, further including holders for said needles having air passages communicating with said eyes through said ports, said holders being mounted to swivel in planes substantially at right angles to said mandrel and to reciprocate together parallel to said mandrel, and flexible air lines connecting said passages to a manifold air supply, whereby air may be fed to said eyes while a plurality of coils are wound on said mandrel.

References Cited

UNITED STATES PATENTS

| 1,046,822 | 12/1912 | Madden | 242—147 |
| 2,728,132 | 12/1955 | Shattuck et al. | 242—157 X |
| 3,003,716 | 10/1961 | Davis et al. | 242—157 X |

FOREIGN PATENTS

| 1,070,264 | 2/1954 | France. |

FRANK J. COHEN, *Primary Examiner.*

NATHAN L. MINTZ, *Assistant Examiner.*